United States Patent [19]

Ohmura

[11] 4,044,488
[45] Aug. 30, 1977

[54] ROD CHUCKING HANDLE FOR A FISHING ROD

[75] Inventor: Ryuichi Ohmura, Shizuoka, Japan

[73] Assignee: Fuji Kogyo Co., Ltd., Japan

[21] Appl. No.: 482,413

[22] Filed: June 24, 1974

[30] Foreign Application Priority Data

June 27, 1973  Japan ................................. 48-76976
Mar. 13, 1974  Japan ................................. 49-28940

[51] Int. Cl.² ............................................ A01K 87/02
[52] U.S. Cl. ...................................................... 43/23
[58] Field of Search ............................................ 43/23

[56] References Cited
U.S. PATENT DOCUMENTS 2,456,681  12/1948  Culver ...................................... 43/23

FOREIGN PATENT DOCUMENTS 1,064,979  12/1953  France ...................................... 43/23

*Primary Examiner*—Warner H. Camp
*Attorney, Agent, or Firm*—Kurt Kelman

[57] ABSTRACT

A rod chucking handle for fishing rods has a front extension having an axial hole for receiving a butt end of a rod, a fixing sleeve screwed over the front extension, an annular groove formed between the end of the extension and the sleeve in such an arrangement as to change its width by movement of the fixing sleeve and an elastic clamping ring disposed in the annular groove and configurated such that the elastic clamping ring is deformed into pressure contact with the outer peripheral surface of the butt end of the rod for joining the fishing rod with the handle by narrowing the width of the annular groove.

1 Claim, 1 Drawing Figure

ROD CHUCKING HANDLE FOR A FISHING ROD

The present invention relates to a rod chucking handle for a fishing rod, and more particularly to an improved mechanism for stably joining a fishing rod to a handle.

Most of the conventional chucking devices used to clamp the butt end of a rod are of the collet-chuck-mechanism type and, together with their bulky structure, tend to damage the butt end of the rod connected thereto.

An object of the present invention is to provide a rod chucking handle for fishing rods capable of firmly joining a fishing rod to the handle quite reliably without damaging the fishing rod.

Another object of the present invention is to provide a rod chucking handle for a fishing rod capable of firmly joining a fishing rod to the handle quite stably even with use of reduced clamping pressure.

In order to attain the above-described objects, according to one aspect of the present invention, an annular clamping ring is made of a material such as rubber which can be easily deformed by application of pressure, excellently resumes its original shape and has a large frictional resistance. Such a clamping ring is disposed into an annular groove formed adjacent the inner wall of an axial hole for receiving the butt end of the rod. The annular clamping ring which is deformed and reduced in inner diameter by narrowing the width of the annular groove, is brought into uniform pressure contact with the outer peripheral surface of the butt end of the fishing rod inserted into the axial hole. The width of the annular groove is controlled by the axial movement of an inner flange formed on the front end of the fixing sleeve.

Further features and advantages of the present invention will become more apparent from the ensuing description, reference being made to the embodiments shown in the accompanying drawings in which.

Figure 1:
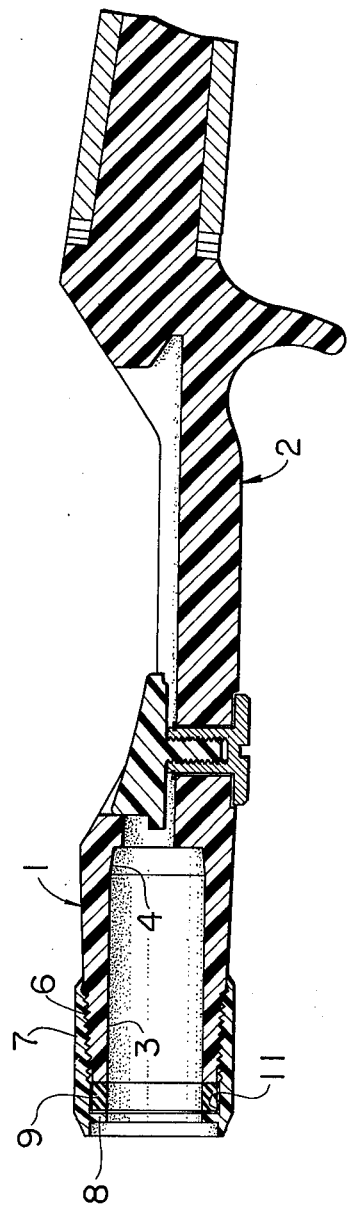
FIG. 1 is a side view, partly in section, of the first embodiment of the present invention.
Figure 3:
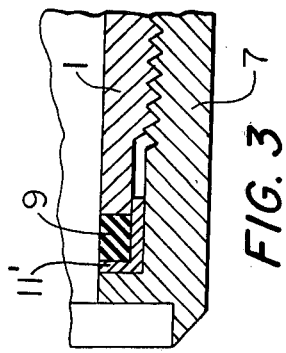
FIG. 3 is a partial section side view illustrating an L-shaped axial turning preventing means.

The first embodiment of the rod chucking device of the present invention is shown in FIG. 1, in which a cylindrical front extension 1 is formed integrally with a handle main body 2 and provided with an axial hole 3 for receiving a butt end of a fishing rod to be joined to the handle. This axial hole 3 is confined by a converging inner wall 4 in the area of its innermost end. The front extension 1 is provided with an outer thread 6 formed in its front area and adapted for screw engagement with a fixing sleeve 7.

The fixing sleeve 7 is provided with an inner flange 8 formed near a front end thereof and an inner diameter of this inner flange 8 approximately coincides with the diameter of the axial hole 3 in the area of a front opening for insertion of the butt end of the fishing rod.

A clamping ring 9 is made of an elastic material having an inner diameter slightly larger than the inner diameter of the axial hole 3. Clamping ring 9 is placed within an annular groove 11 formed between a back shoulder face of the inner flange 8 of the fixing sleeve 7 and a front end face of the front extension 1. The width of the annular groove 11 can be freely adjusted as desired by axial displacement of the fixing sleeve 7 along the outer threaded portion of the front extension 1.

When a fishing rod is to be joined to the chucking device of the above-described structure, a butt end of the fishing rod (not shown) is inserted into the axial hole 3 of the front extension until the rear circular fringe of the butt end comes in contact with the converging inner wall 4. Following this insertion of the butt end, the fixing sleeve 7 is turned so that the same moves rearwards, i.e. towards main body 2. This rearward movement of the fixing sleeve 7 narrows the width of the annular groove 11. The clamping ring 9 resting in the annular groove 11 is compressively deformed so as to minimize its inner diameter and the inner peripheral surface of the clamping ring 9 is brought into tight, snug and uniform pressure contact with the outer peripheral surface of the butt end. Thus the fishing rod is stably joined to the handle.

In the case of the above-described chucking device, it is recommended that the clamping ring 9 be disposed within an anti-frictional casing having an L-shaped cross sectional profile 11. By this means it is possible to prevent the fishing rod from undesirable axial turning which is caused by turning the fixing sleeve.

Figure 2:
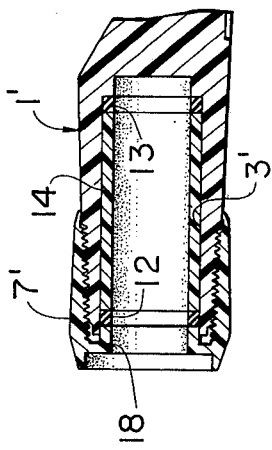
FIG. 2 is a sectional side view of the main part of the second embodiment of the present invention.

The second embodiment of the chucking device according to the present invention is shown in FIG. 2, in which two sets of clamping rings 12 and 13 are disposed in the axial hole 3' of the handle front extension 1' in order to clamp the fishing rod butt end at two spaced positions. The rear side clamping ring 13 of this embodiment is a substitute for the inner converging wall 4 of the foregoing embodiment. The front side clamping ring 12 is placed in abutment with the rear shoulder face of the inner flange 18 of the fixing sleeve 7'. The rear side clamping ring 13 is placed in abutment with a front shoulder face formed near the innermost end of the axial hole 3' and an inner sleeve 14 is slidably inserted into the axial hole 3' in abutment with the two clamping rings 12 and 13'.

The clamping action by the two clamping rings 12 and 13 is caused by narrowing the widths of two annular grooves formed in the axial hole 3' by aid of the inner sleeve 14 slidably inserted into the axial hole 3' and the fixing sleeve 7' screwed over the front extension 1'.

This particular joining mechanism successfully prevents fishing rods from damage caused by the union and makes it possible to join fishing rods of relatively thin tubular structure due to its uniform clamping mechanism. Further, the relatively high frictional resistance of the clamping ring or rings assures reliable clamping of fishing rods even with reduced clamping pressure compared to those required in the conventional clamping mechanisms.

What is claimed is:

1. A rod chucking handle for a fishing rod which comprises in combination, a handle portion having a cylindrical front extension, said extension having an axial hole disposed for receiving a butt end of a fishing pole, said cylindrical front extension having outer threads formed on the front end portion, a fixing sleeve having inner surface threads and matingly disposed over said threads of the cylindrical front extension, said fixing sleeve having an inner flange formed near its front end adjacent a non-threaded surface thereof, an elastic clamping ring having a cylindrical configuration and disposed in a nonthreaded annular recess gap defined by the rear end surface of said inner flange, the adjacent non-threaded surface of the fixing sleeve and a front end surface of said front extension, an anti-friction annular spacer, said spacer having an L-shaped transverse cross-sectional profile taken in half-section from an axial line and having one leg member thereof disposed between the inner flange of the fixing sleeve and the elastic clamping ring, and the other leg member thereof being disposed between the non-threaded surface of the fixing sleeve and the elastic clamping ring, said anti-friction annular spacer being supported in the recess gap by the elastic clamping ring, said axial hole having a terminal rear inner wall converging and disposed to receive the butt end of a fishing pole along the converging inner wall, said threads on the cylindrical front extension and the fixing sleeve being mated such that fastening of the fixing sleeve onto the cylindrical front extension causes narrowing of the annular recess gap and thereby said clamping ring is forced to deform inwardly to provide a reduced inner diameter snugly engaging said butt end and transmitting an axial force thereto, and whereby the butt end of a fishing pole may be secured to the chucking handle by forceful engagement with the converging wall at one end and by the elastic clamping ring along a body portion of the butt end thereof.

* * * * *